United States Patent [19]

Gardner et al.

[11] 4,070,436
[45] Jan. 24, 1978

[54] METHOD OF MANUFACTURING A PNEUMATIC TIRE

[75] Inventors: James Dennis Gardner, Akron; Robert William Glasscock, Canal Fulton, both of Ohio

[73] Assignee: The Firestone Tire and Rubber Company, Akron, Ohio

[21] Appl. No.: 734,221

[22] Filed: Oct. 20, 1976

[51] Int. Cl.² .............................................. B29H 5/02
[52] U.S. Cl. ................................ 264/315; 152/362 R; 425/36; 425/58
[58] Field of Search ............................... 264/315, 326; 152/352 R, 362 R; 425/17, 20, 33, 36, 58

[56] References Cited

U.S. PATENT DOCUMENTS

| | | | |
|---|---|---|---|
| 1,174,885 | 3/1916 | Macbeth | 264/326 |
| 1,399,898 | 12/1921 | Sloper | 264/335 |
| 1,477,391 | 12/1923 | Sloper | 425/32 |
| 1,487,033 | 3/1924 | Sloper | 425/32 |
| 1,487,034 | 3/1924 | Sloper | 425/31 |
| 1,487,035 | 3/1924 | Sloper | 425/31 |
| 1,487,036 | 3/1924 | Sloper | 425/32 |
| 3,237,672 | 3/1966 | McMannis | 264/326 X |
| 3,540,510 | 11/1970 | Smithkey, Jr. | 152/352 R |
| 3,765,468 | 10/1973 | Verdier | 152/352 R |
| 3,900,061 | 8/1975 | Curtiss, Jr. | 152/352 R |

*Primary Examiner*—Jan H. Silbaugh

[57] ABSTRACT

This disclosure relates to an improvement in the "wide stance" method of manufacturing a pneumatic tire. In this method the space between the two annular wire bead bundles of the tire is substantially greater than the space between the beads in their operable condition, mounted on the recommended rim. The improvement comprises the steps of locating the bead areas of the uncured tire which contain the annular wire bead bundles in annular cavities in the tire mold which are adapted to receive the bead areas. This maintains the wire bead bundles in their proper location during the entire curing operation.

3 Claims, 3 Drawing Figures

U.S. Patent  Jan. 24, 1978  4,070,436
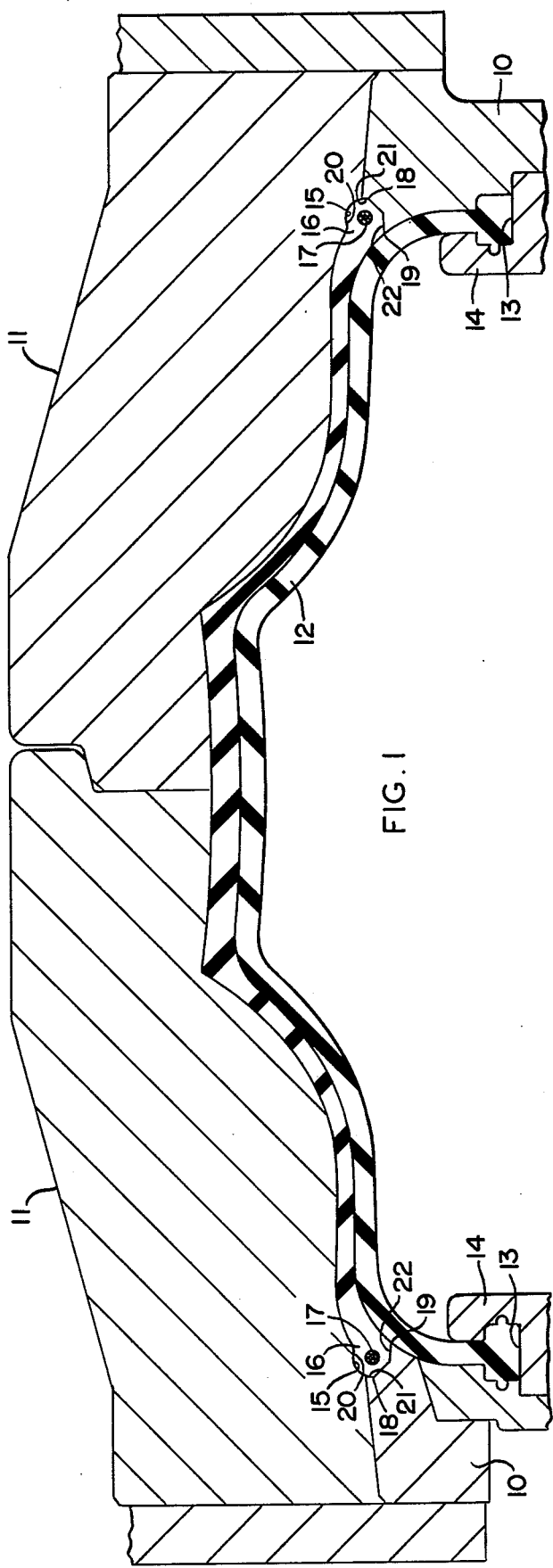
FIG. 1
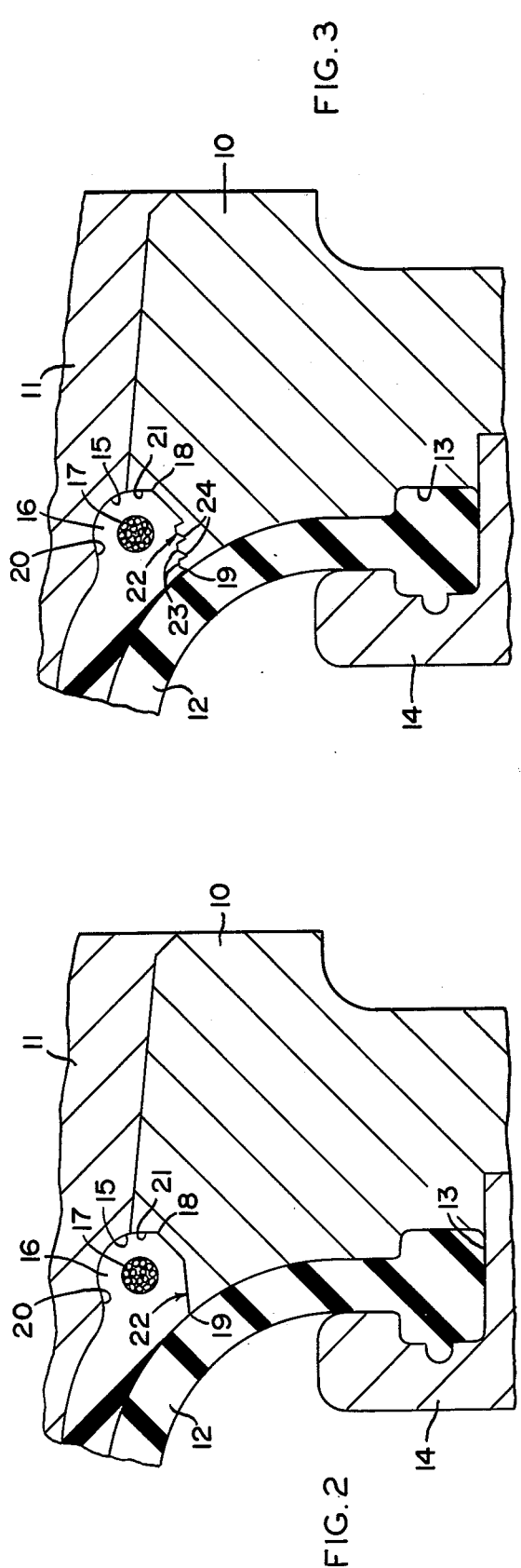
FIG. 2
FIG. 3

METHOD OF MANUFACTURING A PNEUMATIC TIRE

SUMMARY OF THE INVENTION

This invention relates to an improvement in the wide stance method of curing a pneumatic tire. The wide stance method is a method of manufacturing a pneumatic tire wherein the distance between the two bead areas of the tire when it is molded (this distance is known as the "curing width") is substantially greater than the distance between the tire bead area when it is operable; that is, mounted and inflated on its recommended rim (this distance is known as the "rim width"). In the standard method of curing pneumatic tires, the curing width of the bead areas in the mold is approximately equal to or slightly greater than the rim width. In the standard methods, a tire which was designed to be mounted on a rim with a 5.5 inch rim width could have a curing width from 5.5 inches to 7 inches. Prior wide stance methods had larger differences in these values. In either the standard method or prior wide stance methods the parting line between the curing bladder and the mold in the bead area has been located at the bead toe. In this invention this parting line is located at a point on the inner periphery of the tire. This location is a significant distance from the bead toe. This means the mold itself extends axially inwardly to at least the center of the wire bundle and preferably beyond.

Even though the wide stance method is known, it has not been commercially exploited to a great extent. Its known advantages are a simpler curing system. In the wide stance system the tire doesn't have to be molded with its lower sidewall and bead area in the reverse curvature that these areas assume in its mounted, operable condition. This system results in the reduction of curing defects due to trapped air during the curing operation and other surface defects; such as cure folds. It also yields an increase in curing bladder life due to the more cylindrical shape of the bladder during the curing operation. This method has also been found to be successful in the manufacture of collapsible spare tires as disclosed in Applicants' copending application, Ser. No. 674,710, filed Apr. 7, 1976.

A primary reason that the commercial exploitation of wide stance molding techniques has been small is the problem of maintaining the wire bead bundles in the proper location during the curing operation. In the prior wide stance molding techniques the wire bead bundles have tended to be displaced axially inwardly from their proper location during the curing operation. As a result of this, the percent of defective tires manufactured by this method was too high to merit commercial exploitation even though the other advantages of these techniques, as set out above, were known. It is believed that this problem is in part the result of bladder pressure on the bead area of the tire which displaced the wire bead bundles.

The method of this invention solves the wire bead bundle displacement problem mentioned above. In the method of this invention the portion of the tire curing mold where each bead area is located (known as the "bead ring") is provided with an annular cavity to accept the tire bead area containing the wire bead bundle during the shaping operation prior to molding. The pressure of the curing bladder during shaping pushes the bead area and wire bead bundle into this cavity and, due to the configuration of this cavity, the bladder pressures employed during the remainder of the curing cycle hold the wire bead bundles in the proper, designed position.

This improvement is attained by the cavity structure in the mold bead ring wherein the bead area containing the wire bead bundle are protected on three sides by the metal bead ring. As a result of this, the only bladder pressures acting upon the bead area containing the wire bead bundle are pressures axially outwardly. The toe of the bead is contained within this cavity and is not in contact with the curing bladder during the curing operation.

In this method the parting line between the mold bead ring and the curing bladder is located on the band ply (innermost layer in the tire) and is removed from the bead toe. This parting line is located at or axially inwardly of the center of the wire bead bundle. In prior methods curing bladder pressures also acted in a radially outwardly and axially inwardly direction on the wire bead bundles.

An object of this invention is to provide a wide stance curing method in which the tire bead areas containing the wire bead bundles are cured in annular cavities in the tire mold to prohibit any axially inward movement of the wire bead bundle during the curing operation.

Other advantages and objectives of this invention will be evident from the detailed description to follow.

DESCRIPTION OF THE DRAWINGS

FIG. 1 is a cross-sectional view of a tire in a tire mold utilizing the method in this invention;

FIG. 2 is an enlarged fragmentary cross-sectional view of one of the bead areas of FIG. 1;

FIG. 3 is a view similar to FIG. 2 showing an alternative form of the invention.

DETAILED DESCRIPTION

In FIG. 1 the invention is depicted by a cross-sectional view of a tire and a curing mold with the bead ring having a cavity which is adapted to receive the bead area of the tire. This drawing shows the location of the bead area, wire bead bundle and curing bladder during the method of this invention. In FIG. 1 the bead ring is depicted as 10 and the remainder of the curing mold is 11. These are constructed of any of the known materials which are used in the manufacture of tire curing molds. The curing bladder, 12, is attached to the bead ring at annular cavity, 13. The other end of the curing bladder is attached to another ring, 14. The bladder is constructed of a rubber compound known in the art.

The bead ring, 10, contains an annular cavity, 15. This cavity is located and adapted to accept the bead area, 16, of the pneumatic tire. The bead area contains a wire bead bundle, 17, and has bead toe, 18. The parting line between the curing bladder, 12, and the bead ring, 10, is shown at 19.

In this invention the wire bead bundle, 17, should preferably be of the cable bead type construction. Constructions of this type permit internal rotation of the wires in the bead bundle during the shaping of the uncured tire in the mold or during the shaping of the cured tire in mounting on the rim.

The pneumatic tire construction may be any of the known types (ones with bias cord bodies or radial bodies and stabilizer belt plies in the tread area) that are well known in the art. The rubber compounds utilized in the pneumatic tire are also any of the types that are well known in the art.

The annular cavity, 15, in mold bead ring, 10, has sides 20, 21 and 22. These sides are located radially outwardly, axially outwardly, and radially inwardly, respectively, of the bead area and wire bead bundle when the tire is being cured. The intersection of sides 21 and 22 defines the bead toe 18.

In the method of this invention, the uncured tire is placed in the curing mold between the curing bladder and the mold. The mold is closed and the curing bladder is inflated whereby the bead areas and wire bead bundles of the uncured tire are pushed axially outwardly into the cavity 15 of the mold bead ring. After the mold is completely closed and the curing bladder has its maximum internal pressure, the wire bead bundle is located within the annular cavity in the mold bead ring. During the remainder of the curing operation, the internal pressures of the curing bladder can only act to force the wire bead bundle axially outwardly. No forces can operate on the wire bead bundle to move it in an axially inwardly direction. After the curing operation is complete, the internal pressure in the bladder is released, the mold is opened and the tire is removed.

The tire thus produced has a curing width that is substantially greater than its recommended rim width. No problems are encountered in mounting this tire on the rim and inflating it to its operable condition.

FIG. 2 is an enlarged fragmentary view of the right-hand bead area of FIG. 1 showing this area in greater detail. The reference numbers used in FIG. 1 are also used in FIG. 2.

FIG. 3 is another enlarged fragmentary view of a right-hand bead area according to another embodiment of this invention. It depicts an embodiment of the method of this invention which can be utilized in the manufacture of a collapsible type tire. In a copending application, Ser. No. 674,710, filed Apr. 7, 1976, the Applicants have disclosed and claimed a method of manufacturing this type tire. This tire is designed to be used as a spare tire in automobiles wherein storage space is at a premium. The tire may be mounted on its rim and stored deflated. In this deflated condition the overall diameter of the tire is very small. This is accomplished by an arrangement in which the sidewalls of the tire are folded. The tire is stored in this compact condition. When it is desired to use the tire, the tire is inflated on its rim. During inflation the sidewall folds are removed and the overall diameter of the tire increases greatly.

In the Applicants' method of manufacturing a tire of this type, the tire is molded in a substantially cylindrical shape. After mounting on the rim and while in the stored, uninflated condition, the bead areas of the tire extend axially inwardly in a direction approximately parallel to the axis of rotation of the tire. During inflation the bead area of the tire rotates about the bead bundle so that a bead area of the tire rotates approximately 90° to a position approximately perpendicular to the axis of rotation of the tire, the standard toroidal position of the tire bead area.

In this embodiment the bead area, 16 and the bead bundle, 17, are pushed into the annular cavity, 15, of the bead ring, 10, during the shaping operation prior to curing. This was accomplished by the internal pressure within bladder 12. So situated, as depicted in FIG. 3, the wire bead bundle cannot be displaced axially inwardly during the remainder of the curing operation as the only bladder pressures operating on the bead bundle are in an axially outwardly direction. After the curing cycle is completed, the tire is removed from the mold and mounted in the manner described above.

In FIG. 3 the radially inner wall, 22, of the annular cavity, 15, is shown containing annular ribs, 23, which provide corresponding annular grooves in the cured tire. These annular grooves in the tire define annular ribs, 24, in the cured tire. These annular ribs are located on the bead seat of the tire rim when the tire is in its collapsible condition. During the inflation process on the rim these annular ribs facilitate the retention of air so that the bead area will rotate and proper inflation will be attained. It is understood that the embodiment shown in FIG. 3 may not have these ribs and grooves but may be smooth as shown in FIG. 2.

The location of the wire bead bundles in the Figures depicts an essential feature of the method of this invention. The center of the bead bundles must be axially outwardly of the mold parting line, 19, or at least in the same radial plane as the parting line, when the tire resting in the mold prior to the application of pressure by the bladder. This permits the bead bundles to be maintained in their proper places during curing.

Employing the method of this invention, a D78-14 tire has been constructed having two body plies comprised of nylon reinforcing cords of 1260/2 denier and a tread ply comprised of nylon reinforcing cords of 1260/2 denier. The wire bead bundles were comprised of a cable bead with a solid wire core and eight wires helically wrapped around the core. The tire was built on a standard flat building drum utilizing standard building techniques. The tire was cured with the bead configuration shown in FIG. 3. The bead curing width in the mold was 17.25 inches. In the cured shape, the overall diameter of the tread at its circumferential centerline was 19.01 inches.

This tire was mounted on a standard rim having a 5 inch rim width. In its collapsed position the overall diameter of the tread was 19.29 inches. In its inflated, operable condition the overall diameter of the tread was 25.50 inches.

We claim:

1. In the wide stance method of manufacturing a pneumatic tire in which said tire is placed in the curing mold, pressure is applied internally of said tire by a curing bladder to shape said tire into the mold and heat is applied to vulcanize said tire, and wherein said tire has an annular road-engaging tread area and sidewalls connecting the lateral edges of said tread area to bead areas which contain annular wire bead bundles, the improvement comprising providing said mold with two annular bead cavities, each of which is designed to accept one of said bead areas and said annular wire bead bundles so that said mold substantially surrounds said bead bundles in directions axially outwardly and both radially outwardly and radially inwardly, placing said tire into said mold between said curing bladder and said mold so that the parting line between said bladder and said mold is located on the inner periphery of said tire and axially inwardly of the center of said bead bundles, shaping said uncured tire by inflating said bladder with internal pressure, maintaining said bead areas and bead bundles in an unrotated condition after said shaping, closing said mold and vulcanizing said tire.

2. The method of claim 1 wherein the radially inward side of said bead area is provided with ribs and grooves.

3. The method of claim 1 wherein said bead bundles are of the cable bead type.

* * * * *